(12) United States Patent
Dunn

(10) Patent No.: US 6,208,270 B1
(45) Date of Patent: Mar. 27, 2001

(54) DEVICE AND METHOD FOR DETECTION OF AIRCRAFT WIRE HAZARD

(75) Inventor: Murray Dunn, Encinitas, CA (US)

(73) Assignee: Thermotrex Corporation, San Diego, CA (US)

( * ) Notice: Subject to any disclaimer, the term of this patent is extended or adjusted under 35 U.S.C. 154(b) by 0 days.

(21) Appl. No.: 09/192,963

(22) Filed: Nov. 16, 1998

Related U.S. Application Data
(60) Provisional application No. 60/066,057, filed on Nov. 17, 1997.

(51) Int. Cl.[7] ....................................... G08G 5/04
(52) U.S. Cl. .................. 340/961; 340/435; 340/903; 342/29; 701/301
(58) Field of Search ........................ 340/961, 968, 340/435, 903; 701/301; 342/29

(56) References Cited

U.S. PATENT DOCUMENTS

| 3,134,975 | | 5/1964 | Goodman . | |
|---|---|---|---|---|
| 3,850,041 | | 11/1974 | Seaman | 340/435 |
| 4,250,389 | | 2/1981 | Brendl et al. | 250/476 |
| 4,554,459 | | 11/1985 | Tsutsumi et al. | 250/550 |
| 5,249,157 | * | 9/1993 | Taylor | 340/903 |
| 5,323,259 | | 6/1994 | Gibbs | 359/209 |
| 5,448,233 | | 9/1995 | Saban et al. | 340/963 |
| 5,461,357 | | 10/1995 | Yoshioka et al. | 340/435 |

* cited by examiner

*Primary Examiner*—Brent A. Swarthout
(74) *Attorney, Agent, or Firm*—Fish & Richardson P.C.

(57) ABSTRACT

An optical hazard detection system for aircraft based on a dynamic parallax mechanism to alert the pilot of an object in the flight path by a selected amount of time in advance.

19 Claims, 5 Drawing Sheets

DEVICE AND METHOD FOR DETECTION OF AIRCRAFT WIRE HAZARD

CROSS-REFERENCE TO RELATED APPLICATION

This application claims the benefit of U.S. Provisional Application Ser. No. 60/066,057, filed on Nov. 17, 1997, which is incorporated herewith by reference.

TECHNICAL FIELD

This invention relates to optical sensing, and more particularly to a device and method for detecting hazard obstacles for aircraft.

BACKGROUND

Aircraft flying at a relatively low altitude may be subject to risks of colliding with hazard obstacles such as utility wires hung from towers and other high-rise structures. Therefore, it is desirable to provide aircraft with a hazard detection and warning system to improve the aircraft safety.

One way to detect a hazardous object uses "passive" sensing devices to detect radiation emitted from the object. For example, light-sensitive detectors such as CCDs may be used to capture the image of a hazard object or an infrared detector to sense the thermal radiation of an object.

Another detection scheme uses "active" systems which emit certain electromagnetic waves to actively search for hazardous objects by detecting the reflected electromagnetic waves. The time delay between transmitting and receiving a signal may be used to determine the distance of an object and the phase information of the reflected signal(s) may be analyzed to indicate the relative direction and shape of the object.

One implementation of such active detection scheme is the Radar (i.e., radio detection and ranging), in which radio signals are used to probe a radio-reflective object. Another implementation uses laser pulses as the probing signals to detect light-reflective objects by sensing the reflected laser pulses. Since the laser pulses play the similar role as the radio signals in Radar, the latter is also known as light detection and ranging or "Lidar".

SUMMARY

The present invention employs the concept of Lidar in a special way to provide a hazard detection and warning system for low-flying aircraft.

One embodiment of the invention projects a laser beam ahead of the aircraft and detects targets closer than some predetermined maximum range from the aircraft. The laser beam is scanned along the perimeter of a predetermined pattern with respect to the aircraft. The scan pattern may be circular or elliptical and centered along the flight direction of the aircraft. At the predetermined maximum range, the scan pattern may be expanded to a size larger than the aircraft forwarded profile.

One aspect of the invention is a combination of the beam scanner and range measurement, which is referred to as "dynamic parallax". The total propagation time for the laser beam to travel from the aircraft to the target and back to the aircraft due to reflection can be used to allow the scanner to effectively "move" the apparent position of the detector off the target. This sets the maximum and minimum detection range by the placement of the detector.

The details of one or more embodiments of the invention are set forth in the accompanying drawings and the description below. Other features and advantages of the invention will become apparent from the description and drawings, and from the claims.

DESCRIPTION OF DRAWINGS

Like reference numbers and designations in the various drawings indicate like elements.

DETAILED DESCRIPTION OF PREFERRED EMBODIMENT

The present invention is at least in part based on a recognition that a hazard detection system that frequently produces unnecessary warning signals may cause a pilot to develop a tendency to ignore the warning signals and thereby can reduce the effectiveness of the system. Thus, a pilot should be warned of only the hazards that can cause a collision if the pilot does not react within a certain allowed response time.

One embodiment of the invention provides a hazard detection system to detect objects in or near the path of aircraft which usually have a high probability of collision. A probing laser beam is projected ahead of the aircraft to scan a region in and near the flight path. A system in accordance with the invention may be configured to issue warning signals only for detected targets within a predetermined maximum warning time. The maximum warning time is set to be sufficient for the pilot to maneuver the aircraft in order to avoid an approaching target, e.g., about five seconds. This maximum warning time defines a maximum detection distance along the flight path which is a distance that the aircraft would travel during the maximum warning time. The maximum detection distance may change with respect to the aircraft as the flight speed changes. For example, the maximum detection distance reduces as the aircraft slows down. Hence, for a given speed of the aircraft, a target in the flight path of the aircraft would not trigger a warning signal if the target is away from the aircraft more than the corresponding maximum detection distance.

The scan pattern of the probing laser beam at a maximum detection distance along the flight path preferably has a fixed geometry and area sufficiently larger than the spatial profile of the aircraft that is projected along the flight path. Since the speed of the aircraft may vary, the laser scanning angle with respect to the flight direction may vary accordingly in order to keep the scan pattern unchanged. For example, as the aircraft speeds up, the laser scanning angle decreases to maintain the size of the scan pattern at the maximum detection distance.

Figure 1:
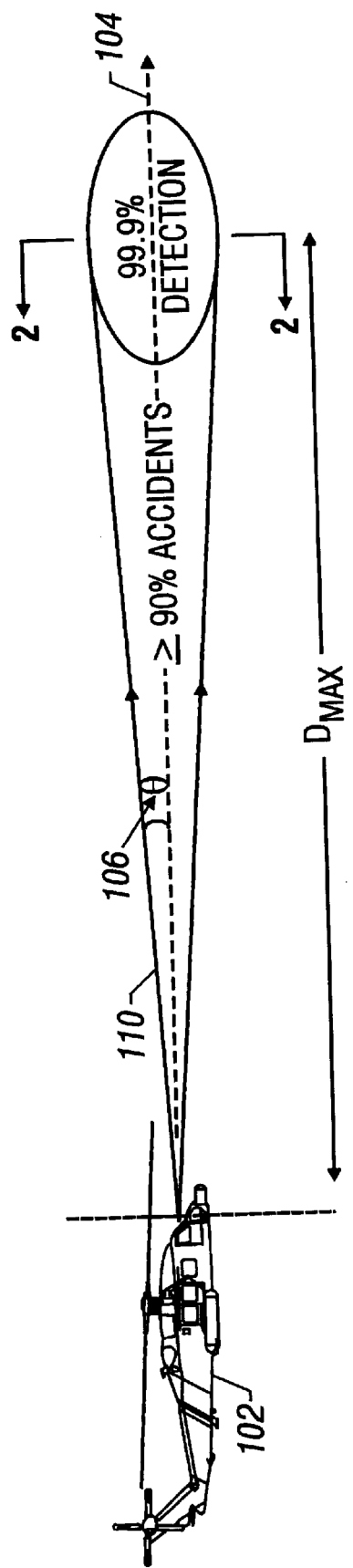
FIG. 1 is diagram showing beam scanning geometry in accordance with one embodiment of the invention.

FIG. 1 is a diagram illustrating the laser scan according to this aspect of the invention. An aircraft 102 equipped with a hazard detection system flies along a flight path 104. A scanning laser beam 110 from the onboard hazard detection system is projected ahead of the aircraft 102 in or near the flight path 104. At a maximum detection distance ($D_{max}$), the scanning laser beam 110 forms a scan pattern 112 which preferably has a spatial extent larger than the cross-sectional profile of the aircraft 102 along the flight path 104. The scanning laser beam 110 forms a scanning angle 106 ($\theta$) with respect to the flight path 104.

Figure 2:
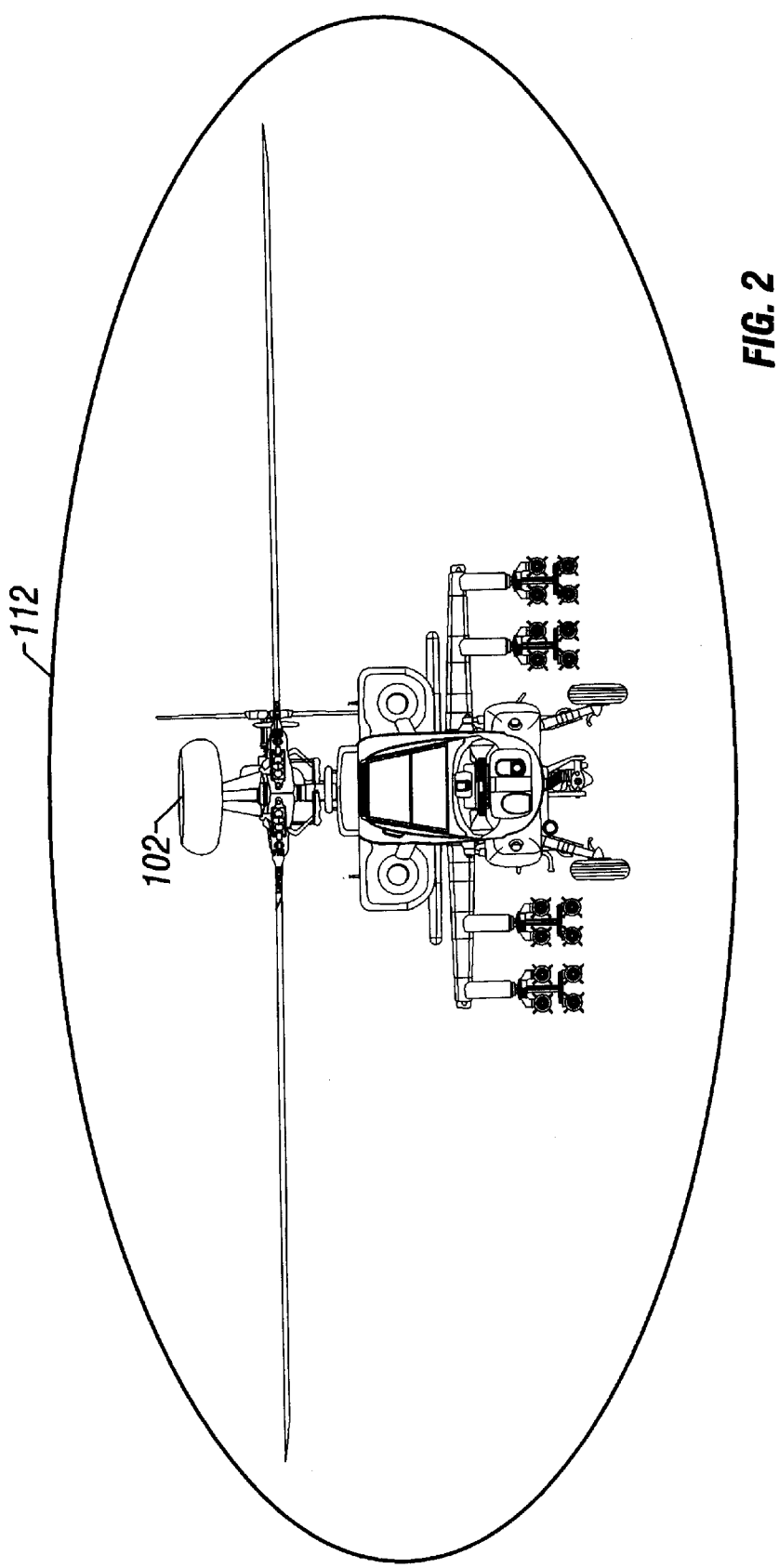
FIG. 2 is a cross sectional view of the beam scan pattern taken along the line 2—2 in FIG. 1.

FIG. 2 shows a cross-sectional view at the maximum detection distance along the line 2—2 in FIG. 1. The scan pattern 112 is shown to be elliptical which covers the cross-sectional profile of the aircraft 102 along the flight path 104. For example, an ellipse with a long axis of about 30 meters and a short axis of about 20 meters may be used as the scanning patten at the maximum detection distance for a helicopter. In general, the scan pattern 112 may be any desired shape and may be chosen based on the aircraft profile, design of the beam scanning mechanism, or other factors.

The maximum detection distance changes with the flying speed of the aircraft 102 since the hazard detection system sets a predetermined fixed warning time. An object located ahead of the aircraft 102 by a distance larger than the maximum detection distance will be ignored by the hazard detection system. As the aircraft 102 changes the flying speed, the maximum detection distance changes and so does the scanning angle 106. Thus, as the aircraft 102 speeds up, the maximum detection distance increases and an object in the flight path 104 that was previously beyond the maximum detection distance may fall within the increased maximum detection range. Conversely, as the aircraft slows down, a warning signal may be canceled since an object may now be outside the changed maximum detection range.

Figure 3:
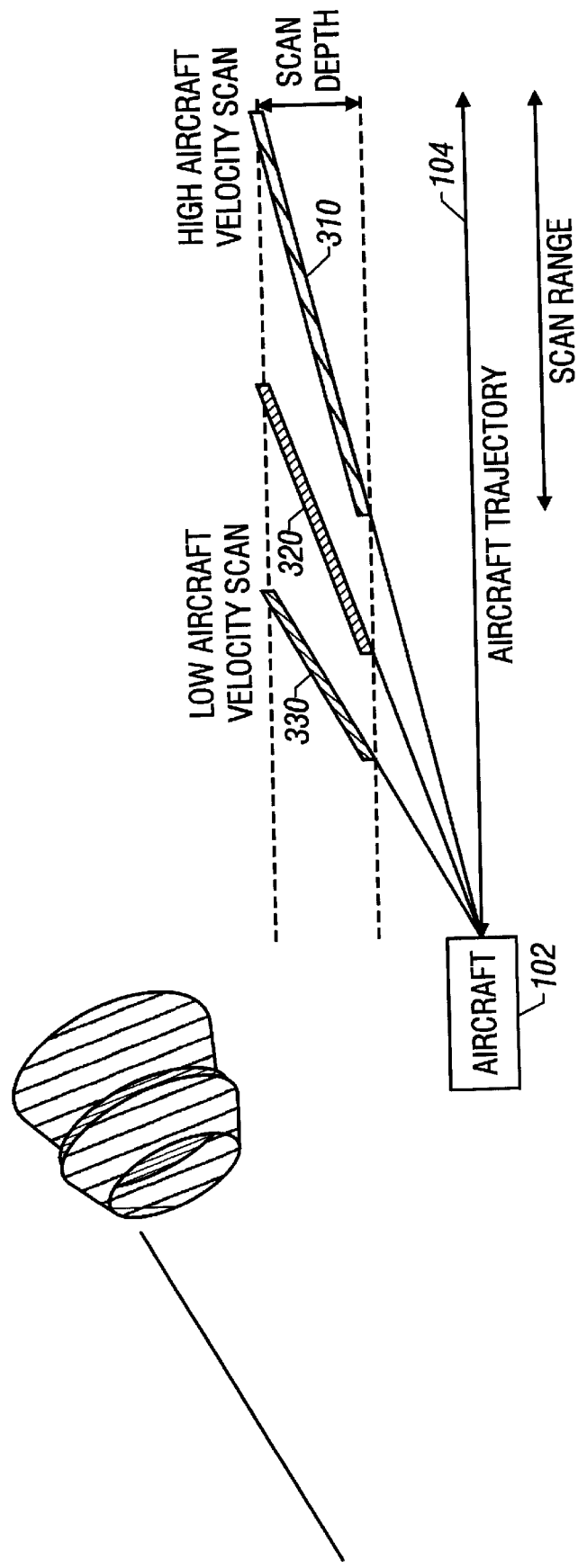
FIG. 3 is a diagram illustrating variations in the scan angle and the maximum detection range with respect to the aircraft speed in accordance with one embodiment of the invention.

FIG. 3 illustrates the scanning angles of the laser beam and maximum detection ranges for three different flying speeds. The laser beam 310 represents the scanning beam at a high speed, the laser beam 320 represents the scanning beam at a medium speed, and the laser beam 330 represents a low speed.

A hazard detection system according to the invention may include a light source such as a laser, a beam scanning module which produces an adjustable scanning angle with respect to the flight path and a desired scan pattern, a light detector, an electronic control and processing module that processes the signal form the light detector to produce the warning signal to the pilot and controls the beam scanning module. The warning signal may be in visual and/or audio form to alert the polit of the detected target.

Figure 4:
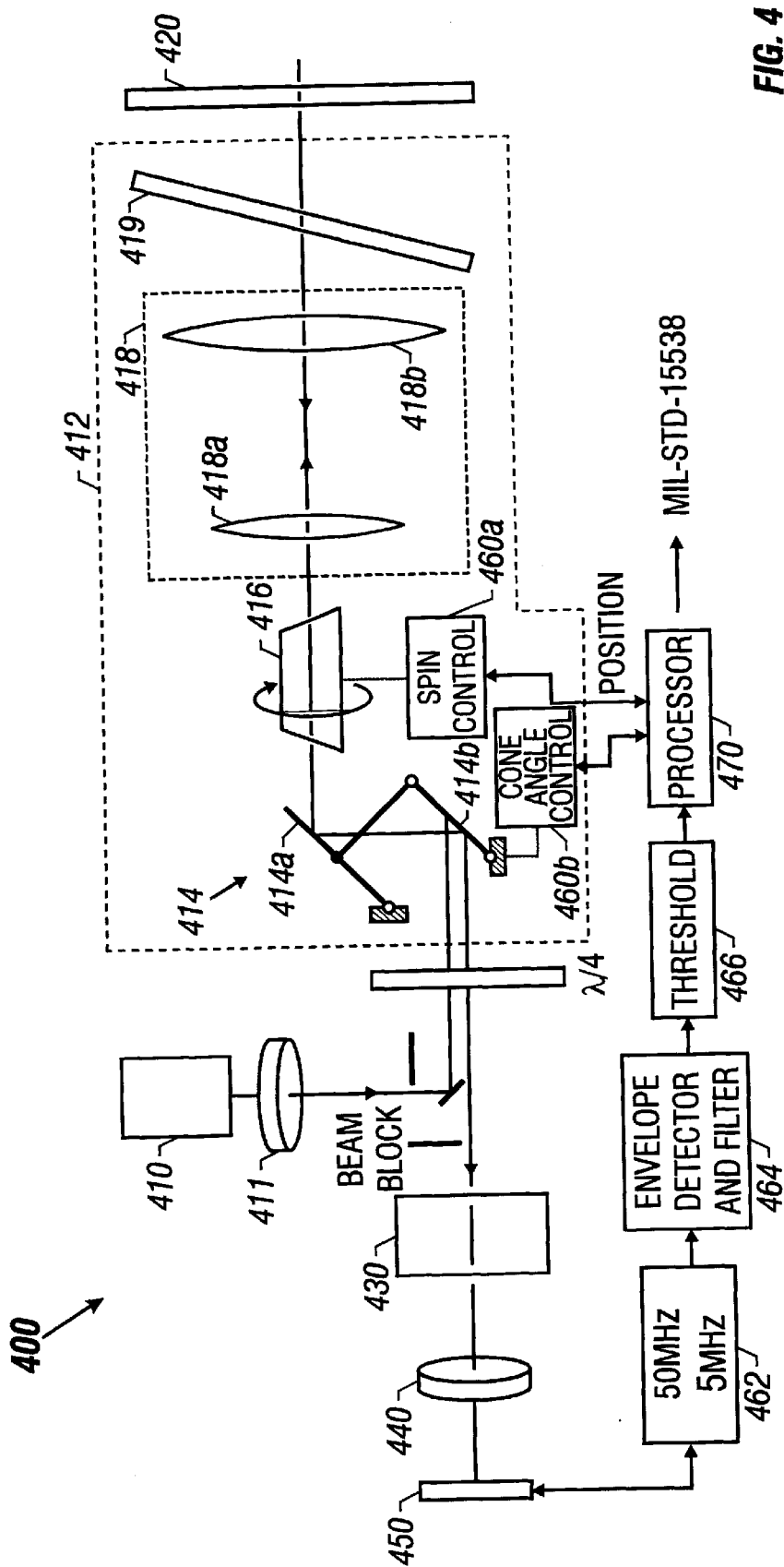
FIG. 4 is a diagram showing one embodiment of a hazard detection system in accordance with the invention.

FIG. 4 is a diagram showing one implementation 400 of the hazard detection system. A laser 410 produces a probe laser beam which is collimated by a lens assembly 411 and directed to a beam scanning module 412. The laser 410 may include a single-frequency diode laser to produce a laser beam at a selected wavelength. The laser beam may be modulated at a specific modulation frequency by using an optical modulator or directly modulating the driving current of the diode laser for implementing a phase-lock detection scheme. Preferably, the output power and wavelength of the laser 410 are chosen to be eye safe. The beam scanning module 412 in this embodiment includes a linked mirror pair 414 as a beam-steering element which has two parallel mirrors 414a and 414b to control the scanning angle $\theta$ with respect to the flight path, a rotating Dove prism 416 which scans the laser beam by rotating about an axis parallel to the flight direction, and an anamorphic optical element 418 which controls the scan pattern. The element 418 may include two cylindrical lens 418a and 418b. A beam steering element 419, such as a transparent plate, may be further included in the module 419 to provide an additional beam control. The linked mirror pair 414 is implemented to maintain the beam at a fixed position within the prism 416 (e.g., the prism center) while the direction of the beam changes.

The reflected optical beam from an target passes the beam scanning module 412 and is directed to a light detector 450 which is operable to determine a location of a beam spot (e.g., a sensing array with detector pixels). An optical bandpass filter 430 with a transmission frequency at or near the laser frequency, such as an interference filter or atomic line filter, may be implemented in the path of the reflected beam to reduce the optical background noise from scattered light and other sources. A lens assembly 440 images the reflected beam to the detector 450.

One aspect of the invention is setting the maximum warning time and thereby the maximum detection range by a "dynamic parallax" mechanism based on the position change of the scanning element in the beam scanning module 412. In the system 400, this scanning element is the Dove prism 416 which constantly spins about an rotation axis to scan the output laser beam. As a reflected beam enters the Dove prism 416, the Dove prism 416 has changed its orientation during the propagation time for the laser beam to travel from the aircraft to the target and back to the aircraft. Therefore, the Dove prism 416 redirects the reflected beam to a direction so that the reflected beam in general will not retrace the original path. Hence, the received reflection will not go back to the light source 410 but is directed to the detector 450.

Figure 5A:
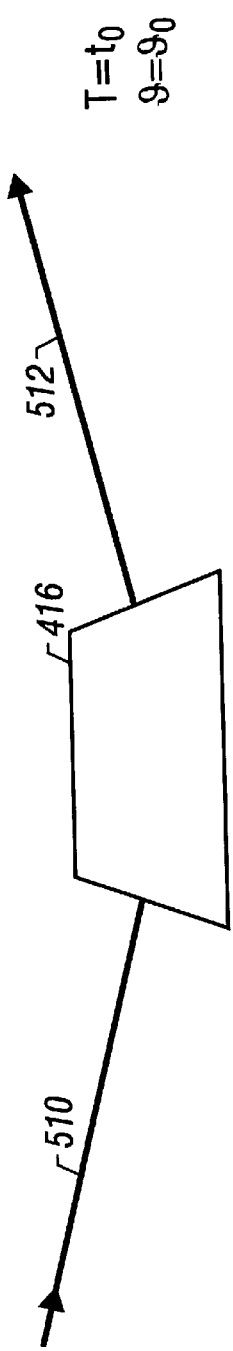
FIGS. 5A, 5B and 5C illustrate a dynamic parallax mechanism based on a correlation between the orientation of a Dove prism and the distance between a reflecting object and the aircraft.
Figure 5B:
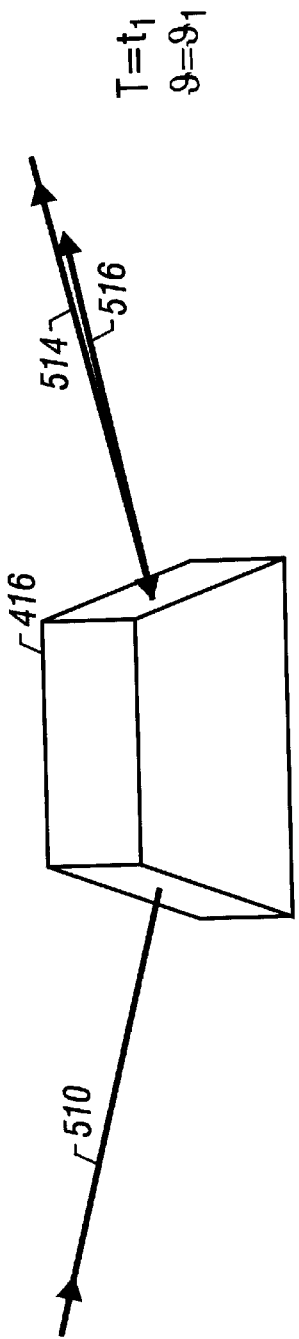
Figure 5C:
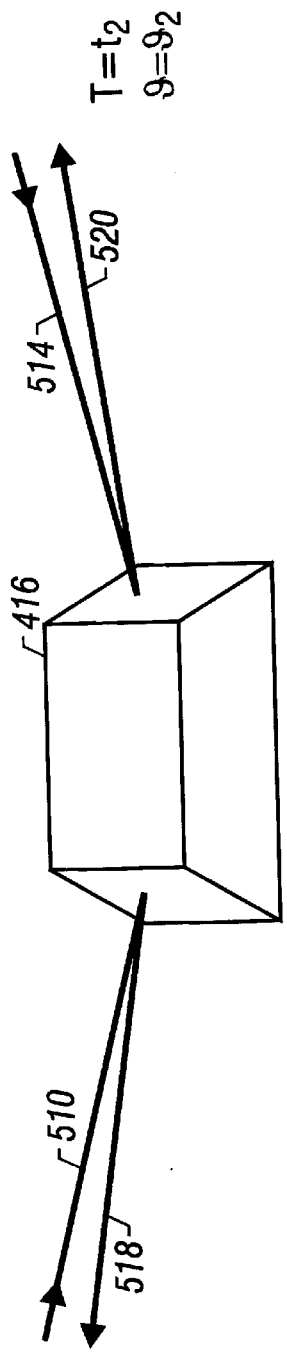

FIGS. 5A, 5B and 5C illustrate this dynamic parallax mechanism. Referring to FIG. 5A, at a moment $t_0$, a beam 510 from the laser 410 enters the Dove prism 416 which is at an orientation $\theta_0$ and exits the Dove prism 416 as an output beam 512. At time $t_1$, the beam 512 hits a target and is reflected as a return beam 514 while the Dove prism 416 reorientates itself to a orientation $\theta_1$ (FIG. 5B). At this time, the beam 510 is directed by the prism 416 to a new direction associated with $\theta_1$ as an output beam 516. The return beam 514 enters the prism 416 at time $t_2$ when the prism 416 is at a new orientation $\theta_2$ to direct the same input beam 510 to a new direction as an output beam 520. Since the prism 416 rotates from the initial orientation $\theta_0$ to $\theta_2$, the return beam 514 is directed to a different direction from the input beam 510 as a beam 518.

For a fixed input beam to the Dove prism 416 from the laser 410, the reflected beam is directed to different directions at different times due to the reorientation of the Dove prism 416. This can be converted into a position change of the reflected beam on the surface of the detector 450. The location of a reflected beam on the detector 450 indicates the propagation time of the laser beam or the distance of a reflecting target. This parallax can be used to directly determine the distance of a reflective object since the speed of light is known. Hence, spatially selecting signals generated in certain regions or locations on the detector 450 can be used to select signals with certain range of propagation times or from targets within certain distance range from the aircraft.

Therefore, the maximum and minimum detection ranges may be set by placing the active area of the detector 450 in a suitable region in the detection plane and/or by using a spatial filtering element (e.g., an aperture, a pinhole or a beam stop) to select reflected beams with a desired range of delays. Preferably, this spatial filtering is used to set a maximum warning time to reduce unnecessary warning signals and increase the effectiveness of the system.

Referring back to FIG. 4, an electronic control and processing module may include a spin control unit 460a to control the rotation of the Dove prism 416 and a cone angle control 460b to control the orientation of the linked mirror pair 414 to alter the scanning angle θ in response to variation in the flying speed.

An electronic bandpass filter 462 centered at the modulation frequency of the laser 410 can be used to filter out signals not modulated at the modulation frequency. This further reduces the background noise in additional to the optical filtering by the optical filter 430. An electronic event filter 464 and a probability thresholding filter 464 can be included to improve the detection reliability output signal from the detector 450. An electronic processor 470 processes the signals from the detector 450 and the beam scanning data from the control units 460a, 460b to generate proper warning signals to the pilot. The processor 470 also dynamically controls the scanning angle θ with respect to the flight path according to the flying speed.

The "dynamic parallax" mechanism based on the correlation of the direction of the reflected beam and the distance between the aircraft and the reflecting target may also be used to implement two or more detection areas at the detector 450 with each corresponding to different warning times and detection ranges. Signals from different detection areas may be used to generate different levels of warnings. For example, signals from a detection area corresponding to a target at least 15 seconds away from the aircraft may be used to generate an alert level warning while signals from a detection area corresponding to a target within 8 seconds away from the aircraft may be used to generate an emergency level warning.

Since the aircraft may change the flying direction from time to time, a target outside the scan pattern and flight path prior to a direction change may fall in the scan pattern and flight path after the direction change. It is possible that such a target may be too close to the aircraft for the pilot to react. One way to prevent this according to the invention is to direct the probe beam to the direction to which the aircraft is to be directed prior to the direction change by a short time. Another way is to implement at least one additional scanning probe beam to simultaneously monitor the direction to which the aircraft is to be directed. A microprocessor may be used to coordinate these operations.

A number of embodiments of the invention have been described. Nevertheless, it will be understood that various modifications may be made without departing from the spirit and scope of the invention. For example, the Dove prism 416 in the embodiment 400 of FIG. 4 may be replaced by any other image-rotating prism and beam scanning element, such as Taylor prism, Abbe prism, the reversion prism, the right-angle prism, and Pechan prism; the linked mirror pair 414 may also be eliminated or replaced with other beam-guiding element; a mechanism may be implemented to tilt the Dove prism 416 with respect to the flight path to change the scan angle θ. Accordingly, other embodiments are within the scope of the following claims.

What is claimed is:

1. An optical detection system mounted on a moving vehicle, comprising:

(a) a light source operable to produce an optical probe beam;

(b) a beam scanning element, disposed relative to the light source to receive the probe beam and configured to rotate about a rotation axis to project the probe beam to trace a scanning pattern for detecting a reflecting object in the path of the probe beam, wherein the beam scanning element receives and directs the reflected probe beam from the object in a direction that correlates to a rotation angle of the scanning element and thereby a distance from the object to the vehicle, and wherein the beam scanning element is operable to adjust the size of a cone angle of the scanning pattern according to a traveling speed of the moving vehicle;

(c) a light detector located relative to the beam scanning element to receive at least a portion of the reflected probe beam at a location on the detector and to produce an electrical signal, wherein the location on the detector has information indicating the distance from the object to the vehicle; and (d) an electronic unit connected to receive the electrical signal and configured to determine the distance from the object to the vehicle according to a time duration for the probe beam traveling to and from the object that is inferred from the reflected probe beam location on the detector.

2. A system as in claim 1, wherein the scanning element includes an image-inverting prism.

3. A system as in claim 2, wherein the image-inverting prism is a Dove prism.

4. A system as in claim 2, wherein the scanning element further includes a beam steering unit disposed in the optical path between the light source and the image-inverting prism and operable to adjust the direction of the probe incident to the image-inverting prism to control a cone angle of the output probe beam from the prism with respect to the moving direction of the vehicle according to the speed of the vehicle.

5. A system as in claim 1, wherein the beam scanning element is configured to maintain the scanning pattern not less than a profile of the vehicle at a detection distance along the moving direction of the vehicle.

6. A system as in claim 1, wherein the detector is configured to receive the reflected probe beam only when the object is spaced from the vehicle within a detection distance for the probe beam to travel within a predetermined time.

7. A system as in claim 6, wherein the scanning element is configured to maintain the size of the scanning pattern at the detection distance which varies with the speed of the vehicle.

8. A system as in claim 1, further comprising a spatial filtering element at the light detector to select only the reflected probe beam for detection when the reflecting object is within a certain distance from the vehicle at a given vehicle speed.

9. A system as in claim 8, wherein said spatial filtering element is further configured to select the reflected probe beam for detection when the reflecting object is within another distance from the vehicle at the given vehicle speed.

10. A method for detecting presence of an object that reflects light in the moving direction of a vehicle, comprising:

(a) projecting a probe beam to trace a scanning pattern ahead of the vehicle along the moving direction by using a beam scanning device;

(b) changing the size of a cone angle of the scanning pattern with a traveling speed of the moving vehicle so as to maintain the scanning pattern not less than a profile of the vehicle at a location ahead of the vehicle;

(c) receiving the reflected probe beam from the object by passing the reflected probe beam through the beam scanning device and directing the reflected probe beam to a light detector; and (d) determining the distance of the object from the vehicle according to a location of the reflected probe beam on the light detector for a given speed of the vehicle and a scanning speed of the beam scanning device.

11. An optical detection system mounted on a moving vehicle, comprising:

(a) a light source operable to produce an optical probe beam;

(b) a beam scanning element, disposed relative to the light source to receive the probe beam and configured to rotate about a rotation axis to project the probe beam to trace a scanning pattern for detecting a reflecting object in the path of the probe beam, wherein the beam scanning element receives and directs the reflected probe beam from the object in a direction that correlates to a rotation angle of the scanning element and thereby a distance from the object to the vehicle, and wherein the beam scanning element is operable to adjust the size of a cone angle of the scanning pattern according to a traveling speed of the moving vehicle;

(c) a light detector located relative to the beam scanning element to receive at least a portion of the reflected probe beam at a location on the detector;

(d) a spatial filter disposed in front of the light detector to allow reflected light beams from certain angles to reach the light detector so as to select reflected light beams from the object only when the vehicle can reach the object at a current traveling speed within a predetermined time; and (e) an electronic unit connected to receive electrical signals from the light detector and configured to produce a warning signal to alert the presence of the object.

12. A system as in claim 11, wherein the scanning element includes an image-inverting prism.

13. A system as in claim 12, wherein the image-inverting prism is a Dove prism.

14. A system as in claim 12, wherein the scanning element includes a beam steering unit disposed in the optical path between the light source and the image-inverting prism and operable to adjust the direction of the probe incident to the image-inverting prism to control a cone angle of the output probe beam from the prism with respect to the moving direction of the vehicle according to the speed of the vehicle.

15. A system as in claim 1, wherein the cone angle of the probe beam is adjusted to increase with a decrease in the speed of the vehicle and to decrease with an increase in the speed of the vehicle.

16. A system as in claim 1, wherein the light detector has different detector areas associated with different distances between the vehicle and the object to produce different signals.

17. A method as in claim 10, further comprising generating a first warning signal when the distance between the object and vehicle is at a value greater than a minimum distance and a second warning signal when the distance is substantially equal to the minimum distance.

18. A method as in claim 10, further comprising:

spatially filtering the reflected probe beam to allow the reflected probe beam to reach the light detector only when the object is within a predetermined distance from the vehicle.

19. A method as in claim 10, wherein the cone angle of the probe beam is adjusted according to the speed of the vehicle to maintain a projected profile of the scanning pattern not less than a profile of the vehicle at a detection distance along the moving direction of the vehicle.

* * * * *